2,850,410

METHOD OF INHIBITING GLYCOLYSIS WITH ARYLALKANOLS

Richard S. Manly, Westwood, Mass., assignor to The Dow Chemical Company, Midland, Mich., a corporation of Delaware No Drawing. Application October 29, 1956
Serial No. 618,693

8 Claims. (Cl. 127—70)

This invention relates to glycolysis inhibition and more particularly to a method for inhibiting enzyme-induced degradation of sugars to acids.

It is well known that many microorganisms attack carbohydrates to obtain and utilize sugars. In such processes, sugar is degraded and organic acids and carbon dioxide are produced. Frequently this breakdown of sugar is desirable, such as in the controlled production of ethanol, butanol, glycerol, citric acid, acetic acid and lactic acid. More frequently, however, the breakdown of carbohydrates and sugars is undesirable both from the standpoint of sugar loss and because of the formation of acids and carbon dioxide. Sugar breakdown also may be a result of normal respiration processes in the sugar containing system such as in plants and plant products. In either case, the breakdown is promoted by glycolytic enzymes.

The term "glycolytic enzyme" as herein employed refers to any enzyme promoting glycolysis and is inclusive of (1) enzymes in their natural environments such as in plants and plant products, (2) enzymes ordinarily associated with microorganisms such as bacteria and fungi, and (3) commercial enzyme preparations. By the expression "glycolysis" is meant the complex enzyme-induced degradation of sugars, inclusive of the production of organic and carbonic acids from sugars and sugar yielding carbohydrates. The expressions "sugar" or "sugars" as herein employed refers to any of many sweet or sweetish carbohydrates which are ketonic or aldehydic derivatives of polyhydric alcohols. The expressions refer particularly to monosaccharides and disaccharides such as sucrose, glucose, fructose, lactose and ribose.

Where sugar is intended for the production of or as a constituent of food, the nutritive value of the sugar containing material or the amount of nutrient material obtainable therefrom is diminished as a result of glycolysis. Instances of sugar loss either through respiration or microbial attack include that in cattle feed, in silage, in harvested fruits and vegetables and in sugar-containing solutions particularly where the concentration of the sugar is less than 50 percent.

Sugar is of economic importance other than as a constituent of food. Its hydroscopic property has found varied applications. Examples of uses of sugar other than in food include that as plasticizer in paper and adhesive compositions, as humectant for the control of moisture content of prepared tobacco, and in pharmaceutical and cosmetic preparations. Degradation is undesirable not only from the standpoint of sugar loss and loss of humectant property, but in the formation of degradation products which are primarily acids and which may impart unpleasant odor and taste to the system as well as provide corrosive properties. Particularly undesirable for acid producing properties are the enzymes of bacteria such as Lactobacilli and Enterococci.

It is desirable to inhibit sugar degradation by glycolytic enzymes in systems containing natural or incorporated sugar as well as in those containing carbohydrate complexes susceptible of hydrolysis to sugar. Furthermore, it is desirable to inhibit degradation in sugar-containing compositions exposed to the atmosphere and susceptible to attack by microorganisms which use sugars in their metabolic processes.

It is an object of this invention to provide a method for inhibiting glycolysis. A further object is to provide a method for inhibiting the enzyme-induced degradation of sugars to acids. A still further object is to provide a method for inhibiting glycolysis brought about by bacterial enzymes. A still further object is to provide a method wherein the inhibitive effect is persistent. Other objects will become evident from the following specification and claims.

In accordance with the present invention, it has been found that effective inhibition of glycolysis in sugar-containing systems may be obtained by treatment of such systems with an arylalkanol of the group consisting of primary and secondary phenylalkanols containing from 8 to 14 carbon atoms, inclusive, and having the structure

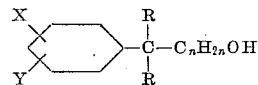

wherein X and Y each represents a member of the group consisting of hydrogen, lower alkyl containing from 1 to 4 carbon atoms, inclusive, and chlorine; each R represents a member of the group consisting of hydrogen and lower alkyl containing from 1 to 4 carbon atoms, inclusive; $n$ is selected from 0 and an integer of from 1 to 2, inclusive; and at least one R is an alkyl radical containing at least 2 carbon atoms when both X and Y are hydrogen; whereby a glycolysis inhibiting concentration of the arylalkanol is retained in the system containing carbohydrate or subject to contact with carbohydrate.

By employing the treatment of the present invention, the formation of undesirable degradation products of sugar may be inhibited substantially without affecting many other enzymatic processes. Furthermore, this may be accomplished with a relatively small amount of active compound, and without adversely affecting the odor or taste in the systems where employed.

The arylalkanol compound with which the present invention is concerned, may be employed in any operable proportion. Desirable results are obtained when a composition having a concentration of at least 0.1 percent of the arylalkanol compound is contacted with the glycolytic enzyme. The optimum concentration will vary with the nature of the enzyme and/or carbohydrate containing system and how the inhibitor is applied. In any event, an inhibiting concentration is required.

The method of treatment with the inhibitor will vary with the system to be protected. Thus, the arylalkanol may be employed on or in a system containing the enzyme or on or in a system containing carbohydrate and susceptible to glycolytic attack. The application may be carried out by spraying, immersion or otherwise contacting the glycolytic enzyme or surface on which it occurs with the appropriate arylalkanol. In the case of plant products, application is made directly thereto. In processed products, it is generally more convenient to incorporate the inhibitor in the sugar-containing composition susceptible to glycolytic attack.

In the practice of this invention, a treating composition containing the arylalkanol as an active ingredient is conveniently employed. A desirable inhibitor composition is one containing from 0.1 to 2 percent or more by weight of arylalkanol as an active ingredient.

In one embodiment of the invention wherein the inhibitor is to provide a protective function, an arylalkanol is incorporated into a carbohydrate composition to obtain a composition having the desired concentration of the active ingredient. The addition may be made from a solution of the arylalkanol in a solvent compatible with the system in which it is to be incorporated. Suitable solvents include propylene glycol, tripropylene glycol methyl ether, ethanol, acetone, glycerol and aqueous mixtures thereof. Alternatively, the compound per se may be added to the carbohydrate composition and intimately mixed therewith. An example of such operation is the addition of an inhibitory concentration of an arylalkanol to carbohydrate adhesive compositions or saccharine solutions to render them resistant to degradation of sugar and formation of acids and other undesirable products.

Representative inhibited carbohydrate compositions include the following:

EXAMPLE I.—GUM ARABIC MUCILAGE

| | Parts by weight |
|---|---|
| Gum arabic (gum acacia) | 10.0 |
| Rice starch | 10.0 |
| Sugar | 40.0 |
| Water | 100.0 |
| β-Ethylphenethyl alcohol | 0.2–0.4 |

EXAMPLE II.—REMOISTENING LABEL ADHESIVE

| Constituent: | Parts by weight |
|---|---|
| Water | 47.4 |
| Tapioca dextrin | 47.4 |
| Glucose | 4.8 |
| Scent, e. g., methyl salicylate | 0.2 |
| Alcohol | 0.2 |
| 3,4-dichloro-α-methylbenzyl alcohol | 0.2–0.4 |

Representative application in cosmetic preparations include:

EXAMPLE III.—HAIR WAVE LOTION

| | Parts by weight |
|---|---|
| Quince seed (mucilage) | 20 |
| Water | 950 |
| Alcohol | 5 |
| Perfume | To suit |
| p-Ethylphenethyl alcohol | 1 |

EXAMPLE IV.—HAND LOTION

| | Percent by weight |
|---|---|
| White beeswax | 4.125 |
| Glycerine | 2.000 |
| Pulverized soap | 3.375 |
| Borax | 0.375 |
| Almond oil | 3.000 |
| Honey | 1.250 |
| Quince seed | 1.500 |
| Alcohol | 1.500 |
| Water | 80.550 |
| Witch hazel | 1.500 |
| Boric acid | .175 |
| Perfume | .500 |
| β-Ethylphenethyl alcohol | .150 |

EXAMPLE V.—HAND LOTION

| | Percent by weight |
|---|---|
| Beeswax | 1.00 |
| Quince mucilage | 2.75 |
| Stearic acid | 1.65 |
| Borax | 2.50 |
| Glycerin | 3.00 |
| Water | 85.45 |
| Perfume | 0.50 |
| Alcohol | 3.00 |
| 2,4-dichlorophenethyl alcohol | 0.15 |

EXAMPLE VI.—LIGHT GOODS SIZING AGENT

| | Percent by weight |
|---|---|
| Water | 40 |
| Soluble potato starch | 1.5–2.5 |
| Glucose | 3–5 |
| 2,4-dichloro-α-methylbenzyl alcohol | 0.1–0.2 |

In addition, suitable arylalkanols may be incorporated, at concentration levels of from 0.5 percent to 1 percent by weight, into compositions having sugar concentration of less than 30 percent which are particularly susceptible to microbially induced glycolysis.

In a modification of the protective application of the inhibitor, arylalkanol is applied to the surfaces of carbohydrate containing substances. This method is particularly adaptable to plant products. These products not only have glycolytic enzymes within their system but also provide particularly favorable conditions for making carbohydrates readily available to bacteria and fungi. Glycolysis in such systems may be impeded by spraying or dipping with an inhibitor composition. An example of a suitable dip composition such as may be employed for fruits is one containing from 0.1 percent to 0.25 percent arylalkanol and prepared by diluting the following concentrate composition.

| | Percent by weight |
|---|---|
| Arylalkanol | 44 |
| Surface active agent (e. g., an alkyl aryl sulfonate) | 2.5 |
| Isopropyl alcohol | 20.4 |
| Water | 33.1 |

Further partially processed products such as raw sugar may be sprayed with a similar inhibitor composition.

In another embodiment of the invention, a composition containing from about 0.1 to 3 percent or more of an arylalkanol is placed in contact with and allowed to act on a system already containing glycolytic enzymes. In such operation, the arylalkanols may be prepared as liquid or solid concentrates and subsequently diluted to produce a treating composition of the desired concentration. Liquid concentrates may be prepared by incorporating from about 2 to 50 percent of the active ingredient in solvents such as acetone, glycerol, propylene glycol, ethanol and isopropyl alcohol. Such concentrate compositions may then be further diluted with water or incorporated into aqueous compositions to obtain the desired concentration of the enzyme-inhibiting constituent and applied as sprays and washing solutions. Concentrate compositions may also be incorporated into pastes and emulsions adapted for direct application. Instead of incorporating the arylalkanol as a concentrate, the compound may be added to the ultimate mixture to give a composition of the appropriate concentration. Such compositions when contacted with glycolytic enzymes such as those present in Lactobacilli, Enterococci and yeast organisms in some way inactivate them, preventing them from performing their normal function.

While the gross demonstration of glycolytic inhibition is not difficult, the provision of means for comparing the relative effectiveness of various inhibitors has represented a problem. To the solution of this problem a procedure has been developed whereby the precise degree of activity of glycolysis inhibitors can be determined and reproduced. This procedure is very similar to that described in Journal of Dental Research 33, pages 561–70 (1954) and Proceedings of the Scientific Section of the Toilet Goods Association, Number 22, December 1954, pages 1–3. In such operation an enzyme containing system is immersed in an arylalkanol composition and the enzyme system thereafter withdrawn from the treating solution. The inhibiting property of the arylalkanol is that exerted upon subsequent contact of the enzyme system with sugar or other carbohydrate compositions. The extent of glycolysis as exhibited by acid production is then measured and compared with the extent of glycolysis occurring in the presence of untreated enzyme. The measurements are carried out in a cell containing one calomel reference electrode and 2 glass electrodes. In each determination, one glass electrode measures the pH of the enzyme system and the other the pH of the solution in which the enzyme system is immersed.

In carrying out the procedure, salivary sediment containing glycolytic enzymes is pipetted into a shaped nylon mesh thimble. The thimble containing the sediment is positioned carefully against one of the glass electrodes. The sediment covered electrode is immersed in a glucose-buffer solution 0.2 molar with respect to glucose and 0.01 molar with respect to $CO_2$-$NaHCO_3$ buffer. Upon immersion, the glucose solution diffuses into the sediment and in time is gradually converted to acid. As the acid accumulates, the pH of the sediment in contact with the glass electrode is lowered. The other glass electrode is also immersed in the buffer solution. After a steady state is attained, the pH of the sediment and the pH of the solution are determined. The difference in these pH values is a measure of the acid produced by glycolysis.

Both electrodes are then immersed in a solution comprising an arylalkanol inhibitor in an appropriate buffer medium and allowed to remain for a given time. The electrodes are then removed, rinsed and returned to the glucose-buffer solution. The pH values of the buffer and sediment are again measured after a steady state has been attained. From these readings, the residual effectiveness of the arylalkanol in inhibiting the glycolytic activity of the enzyme in the salivary sediment is calculated.

An effective inhibitor is one which is retained by the system thereby having a residual inhibitory effect. Thus the extent of control on acid production in a glucose-bicarbonate buffer solution containing no inhibitor by an inhibitor-contacted sediment is significant. The percent acid production in a glucose-bicarbonate solution in the presence of a sediment subsequent to contact with an arylalkanol-containing solution as compared with the acid production prior to such contact is a measure of the effectiveness of the arylalkanol as a glycolysis inhibitor. This measurement has been called the "recovery" in acid production, and is a measure of the residual influence of the arylalkanol. It is calculated according to the following equation:

$$\frac{\text{pH differential after contact with arylalkanol}}{\text{pH differential before contact with arylalkanol}} \times 100 = \text{Recovery (percent of Control)}$$

Thus it may be seen that the higher the recovery value, the lower the effectiveness of the arylalkanol as a glycolysis inhibitor.

In each of a series of operations, a fifteen milliliter portion of paraffin-stimulated human saliva was centrifuged at 2400 revolutions per minute for 20 minutes, the supernatant liquid decanted and the precipitate stirred. 0.1 milliliter of the semi-solid precipitate was pipetted into a nylon mesh thimble having a diameter slightly larger than that of a glass electrode of a pH meter. A glass electrode was positioned in the thimble containing the sediment so that the hemisphere of the electrode just contacted the sediment thereby forming a film of definite thickness on the surface of the electrode and the thimble then fastened to the electrode.

The thimble-covered or "sediment electrode" was immersed in a control buffer solution, 0.2 molar with respect to glucose and 0.01 molar with respect to $CO_2$-$NaHCO_3$ buffer. A second glass electrode or "solution electrode" was likewise immersed in the buffer solution. The calomel "reference electrode" employed had a connection in common with the two electrodes. The pH measured by the "solution electrode" and the "sediment electrode" was automatically recorded. The pH of the "sediment electrode" reached an equilibrium value within twenty to thirty minutes. The difference between the pH of the "sediment electrode" and the "solution electrode" at this time was noted as the differential pH, and was a measure of the glycolytic activity of the sediment.

The glucose-buffer solution was then replaced with an inhibitor solution prepared by dissolving an arylalkanol in propylene glycol to produce a 2 percent by weight concentrate and diluting the latter with saliva supernatant liquid to give a composition containing 1 percent of the arylalkanol in 50 percent propylene glycol. The sediment was allowed to remain in contact with the inhibitor solution for fifteen minutes. The sediment was then removed, rinsed and returned to the control solution and the recorded equilibrium pH values of the "solution electrode" and "sediment electrode" again noted.

From the results, recovery was calculated according to the following equation:

$$\text{Recovery} = 100 \times \frac{\begin{pmatrix}\text{pH of buffer at} \\ \text{end of first} \\ \text{control period}\end{pmatrix} - \begin{pmatrix}\text{pH of sediment at} \\ \text{end of first control} \\ \text{period}\end{pmatrix}}{\begin{pmatrix}\text{pH of buffer at} \\ \text{end of second} \\ \text{control period}\end{pmatrix} - \begin{pmatrix}\text{pH of sediment at} \\ \text{end of second control} \\ \text{period}\end{pmatrix}}$$

In addition, a solvent check was made for each determination. In these solvent checks, acid formation by the action of glycolytic enzymes was determined in a 50:50 saliva supernatant–propylene glycol solution in the absence of arylalkanols. Some range in the solvent check determinations appeared attributable to the different saliva samples employed. The results obtained were as follows:

*Table 1*

| Arylalkanol | Recovery (percent of control) | | Solvent check (percent of control) |
|---|---|---|---|
| | 1st replicate | 2nd replicate | |
| m- and p-Methyl-phenethyl alcohol | 32 | 20 | 95 |
| x, x-Dimethylphenethyl alcohol [1] | 16 | 15 | 108 |
| x, x-Diethylphenethyl alcohol [1] | 36 | 31 | 117 |
| p-Chlorophenethyl alcohol | 56 | 58 | 110 |
| β-Ethylphenethyl alcohol | 46 | 23 | 95 |
| 4-methyl-4-phenyl-2-pentanol | 34 | 36 | 103 |
| 2, 4-dichlorophenethyl alcohol | 4 | 6 | |
| 2, 5-dichlorophenethyl alcohol | 4 | 6 | |
| α-Propylbenzyl alcohol | 36 | 41 | 95 |
| 2, 4-dichloro-α-methylbenzyl alcohol | 24 | 17 | 109 |
| 2, 5-dichloro-α-methylbenzyl alcohol | 51 | 58 | 95 |
| 3, 4-dichloro-α-methylbenzyl alcohol | 19 | 12 | 96 |
| p-Isopropyl-α-methylbenzyl alcohol | 19 | 19 | |

[1] The alkyl substitution is on the phenyl ring; the position of the alkyl substitution has not been determined.

In a similar operation and determination a concentrate containing 5 percent by weight of arylalkanol in propylene glycol was diluted 4 to 1 with saliva supernatant to obtain an inhibitor composition as a 1 percent solution of arylalkanol in 20 percent propylene glycol solution. A solvent check of a 20 percent propylene glycol, 80 percent saliva supernatant was made. The results obtained were as follows:

*Table 2*

| Arylalkanol | Recovery (percent of control) | | Solvent check (percent of control) |
|---|---|---|---|
| | 1st replicate | 2nd replicate | |
| m- and p-Methyl-phenethyl alcohol | 60 | 36 | 95 |
| p-Ethylphenethyl alcohol | 38 | 46 | 97 |
| β-Ethylphenethyl alcohol | 28 | 38 | 112 |

In a further preparation and determination, a concentrate of 1.0 arylalkanol in propylene glycol was diluted 1 to 1 with saliva supernatant to obtain inhibited compositions containing 0.5 percent solution of arylalkanol in 50 percent propylene glycol. The appropriate solvent check was made. The following results were obtained:

Table 3

| Arylalkanol | Recovery (percent of control) | | Solvent check (percent of control) |
|---|---|---|---|
| | 1st replicate | 2nd replicate | |
| 2, 4-dichloro-α-methylbenzyl alcohol | 54 | 33 | 88 |
| 3, 4-dichloro-α-methylbenzyl alcohol | 40 | 32 | 88 |
| p-Isopropyl-α-methylbenzyl alcohol | 15 | 29 | 103 |

I claim:

1. A method for inhibiting glycolysis which comprises contacting a glycolytic enzyme with an arylalkanol of the group consisting of primary and secondary phenylalkanols containing from 8 to 14 carbon atoms, inclusive, and having the structure

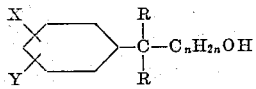

wherein X and Y each represents a member of the group consisting of hydrogen, lower alkyl containing from 1 to 4 carbon atoms, inclusive, and chlorine; each R represents a member of the group consisting of hydrogen and lower alkyl containing from 1 to 4 carbon atoms, inclusive; $n$ is selected from 0 and an integer of from 1 to 2, inclusive; and at least one R is an alkyl radical containing at least 2 carbon atoms when both X and Y are hydrogen.

2. A method according to claim 1 wherein the glycolytic enzyme inhibited is one normally associated with a microorganism.

3. A method according to claim 2 wherein the microorganism is bacteria selected from the genera Lactobacilli and Enterococci.

4. A method for inhibiting glycolysis which comprises contacting a glycolytic enzyme with an inhibitor composition comprising at least 0.1 percent by weight of an arylalkanol of the group consisting of primary and secondary phenylalkanols containing from 8 to 14 carbon atoms, inclusive, and having the structure

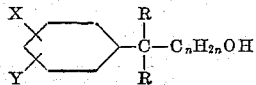

wherein X and Y each represents a member of the group consisting of hydrogen, lower alkyl containing from 1 to 4 carbon atoms, inclusive, and chlorine; each R represents a member of the group consisting of hydrogen and lower alkyl containing from 1 to 4 carbon atoms, inclusive; $n$ is selected from 0 and an integer of from 1 to 2, inclusive; and at least one R is an alkyl radical containing at least 2 carbon atoms when both X and Y are hydrogen.

5. A method according to claim 4 wherein the inhibitor composition comprises from 0.1 percent to 3 percent by weight of the inhibitor.

6. A method for inhibiting an enzyme-induced degradation of sugar and sugar yielding carbohydrates which comprises contacting a system comprising carbohydrate and a glycolytic enzyme with an arylalkanol of the group consisting of primary and secondary phenylalkanols containing from 8 to 14 carbon atoms, inclusive, and having the structure

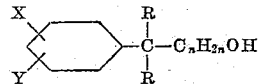

wherein X and Y each represents a member of the group consisting of hydrogen, lower alkyl containing from 1 to 4 carbon atoms, inclusive, and chlorine; each R represents a member of the group consisting of hydrogen and lower alkyl containing from 1 to 4 carbon atoms, inclusive; $n$ is selected from 0 and an integer of from 1 to 2, inclusive; and at least one R is an alkyl radical containing at least 2 carbon atoms when both X and Y are hydrogen.

7. A method according to claim 6 wherein a system comprising carbohydrate and a glycolytic enzyme is contacted with an inhibitor composition comprising at least 0.1 percent by weight of arylalkanol.

8. A method for inhibiting enzyme-induced degradation of sugar and sugar yielding carbohydrates which comprises incorporating in a carbohydrate composition susceptible to enzymatic degradation at least 0.1 percent by weight of an arylalkanol of the group consisting of primary and secondary phenylalkanols containing from 8 to 14 carbon atoms, inclusive, and having the structure

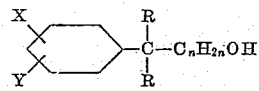

wherein X and Y each represents a member of the group consisting of hydrogen, lower alkyl containing from 1 to 4 carbon atoms, inclusive, and chlorine; each R represents a member of the group consisting of hydrogen and lower alkyl containing from 1 to 4 carbon atoms, inclusive; $n$ is selected from 0 and an integer of from 1 to 2, inclusive; and at least one R is an alkyl radical containing at least 2 carbon atoms when both X and Y are hydrogen.

References Cited in the file of this patent

Chem. Abstr., vol. 45, (1951), page 5231 (i).